United States Patent [19]

Skala

[11] Patent Number: 4,532,554

[45] Date of Patent: Jul. 30, 1985

[54] FACSIMILE PUBLISHING SYSTEM

[76] Inventor: Stephen F. Skala, 3839 S. Wenonah, Berwyn, Ill. 60402

[21] Appl. No.: 440,501

[22] Filed: Jan. 10, 1983

Related U.S. Application Data

[63] Continuation-in-part of Ser. No. 385,915, Jun. 7, 1982, Pat. No. 4,417,252.

[51] Int. Cl.[3] .............................................. H04N 1/40

[52] U.S. Cl. .................................. 358/257; 358/280; 358/903

[58] Field of Search ................ 358/256, 257, 903, 280

[56] References Cited

U.S. PATENT DOCUMENTS

| | | | |
|---|---|---|---|
| 4,207,598 | 6/1980 | Reich | 358/257 |
| 4,317,136 | 2/1982 | Keyt | 358/257 |
| 4,415,981 | 11/1983 | Cutter | 358/257 |
| 4,417,252 | 11/1983 | Skala | 341/1 |
| 4,432,020 | 2/1984 | Onose | 358/257 |
| 4,437,127 | 3/1984 | Hirose | 358/257 |

*Primary Examiner*—Howard W. Britton
*Attorney, Agent, or Firm*—Stephen F. Skala

[57] ABSTRACT

In a facsimile publishing system, a plurality of editorial entities prepare page information for transformation to page signals which are transmitted to a communications satellite for broadcast. The broadcast page signals are received by a plurality of publishing facilities to print custom publications according to individual subscriber interest for daily delivery. The page signals comprise a facsimile signal portion which represents graphic and synchronizing information to control a facsimile printer and an identifying code portion which represents identifying attributes of page content to control selection of pages. The page signal is received by a publishing facility, the facsimile signal portion is stored at an assigned address in a primary memory, and the identifying code portion is stored in association with the assigned address in a page memory. Pages selected by subscribers are stored in a subscriber file as title and editorial entity portions of the identifying code. The page selections are read and transferred to the page address memory for matching with the identifying codes stored therein and the associated addresses are transferred to the primary memory. The primary memory transfers the facsimile signal contents of the addresses to a secondary memory which is read at printing speed to control a facsimile printer. Operations on the subscriber selected pages control selection of complementary pages and other materials for advertisers. The process is repeated until all subscriber entries in the subscriber file are read to control printing of custom publications.

30 Claims, 4 Drawing Figures

FACSIMILE PUBLISHING SYSTEM

This application is a continuation-in-part of application Ser. No. 385,915 filed June 7, 1982 and now U.S. Pat. No. 4,417,252.

BACKGROUND

This invention relates to facsimile publishing and particularly to a facsimile publishing system and process wherein content of each publication is selected from stored page signals according to individual subscriber interests.

Basic elements of facsimile communication comprise means for transforming graphic information into electrical signals, a communications channel between a transmitter and receiver of the signals, and a signal responsive printer for transforming the signal back into graphic information in the form of a recorded image. These basic elements are present in facsimile systems for publishing and are selected and modified for economical operation on an appropriate scale. Minimally, the communications channels are accessible to editorial entities to provide adequate capacity at moderate cost and the facsimile printer can record an image of high graphic quality on both sides of ordinary newsprint for competitive economies. Ideally, the facsimile publishing system processes graphic information and reduces costs to such an extent that technological and economic constraints are removed from editorial entities to enable publication of any written work and are removed from subscribers to enable selection of any pages of interest. This ideal leaves only the limits of editorial entities to create and of subscribers to understand.

Portions of facsimile systems which have been adapted for conventional publishing include a communications satellite as a channel between distant facilities to control preparation of printing plates. Facsimile signals could be stored to control press runs by a facsimile printer, but content of such publications would still be the same for all subscribers. An ultimate reduction of scale to a single subscriber would enable publication according to his individual interests but experiments in home facsimile have not been a commercial success, partly because of cost and reliability factors and partly because of inadequate content. Home facsimile has been regarded as an adjunct to television with facsimile content complementary to television programming. As a convenience, facsimile signals were relegated to the narrow bandwidth of the blanking interval of a television signal which precluded home facsimile from becoming an alternative to conventional publishing. But even a home facsimile system with sufficient channel capacity for newspaper printing may be at a competitive disadvantage since cost, complexity, and required maintenance could limit penetration to such an extent that the system could not support the increase of content needed to justify printer purchase by the public.

Conventional publications comprising newspapers, magazines, and newsletters have evolved as integrated systems by adapting to technological and economic constraints to provide a wide spectrum of content. The publications have become identified with particular ranges of subject matter enduring values and graphic quality, and levels of expertize and specialization. Participants comprising subscribers, editorial entities, publishers, and advertizers each balance cost and value to influence content, scale of publication, materials and processes, and delivery modes. For an individual subscriber, effective information content of a publication is limited to those portions which are in accord with his interests and which he actually reads. The remainder represents wasted materials and processing. It would be efficient to select only pages and features of particular interest, but such critical selection would show that precise subject catagories at a precise level of expertize were seldom available. Thus selective capability would have to be combined with increased output of editorial entities. But an emerging independent editorial entity would encounter cost barriers of establishing or leasing publishing facilities. An editorial entity may accept employment as part of an existing publishing organization or submit manuscripts thereto but such dependence is undesirable since creative editorial entities who are motivated to analyse new concepts then defer to judgements of conservative publishers who are more motivated to maintain their traditional markets and earnings. Such limits upon choice for subscribers and upon access for editorial entities are intrinsic to the technology and economics of conventional publishing systems. Advertizing is a significant factor in publishing which benefits publishers with revenues and subscribers with reduced subscription costs. The advertizing content is conditioned by the type of publication. Newspaper advertizing tends to local retail and classified catagories in accordance with a newspaper's high local penetration and general readership. Magazine advertizing tends to be national and related to the editorial character of the magazine in accordance with its national circulation and specialized interests. A newsletter, with its limited circulation, tends to rely primarily upon subscription revenues. Advertizers attempt to target particular catagories of readers according to their editorial preferences, but such targeting is not precise insofar as the editorial policies are diverse.

A medium of communications has value according to its capacity for content and its conditioning of content. Television, for example, is most effective as a descriptive medium and can efficiently communicate phenomenal aspects of an event directly through cameras. Publications are most effective as abstract and analytical media and are more oriented toward "why" than "what". Such abstract and analytical functions are best served by the efficient logic enabled by words and other symbols. As a consequence of its function as an analytical medium, print is as potentially diverse as the many ways events can be understood through their analyses. It is useful to indicate this potential diversity by representing the subject of analysis as combinations of attributes which include subject catagory, level of expertize, significant values and premises, and literary styles. Each of these and other attributes have numerous particular subdivisions which can be enumerated by means of binary words for convenient processing by digital circuits. The number of binary words in each attribute catagory is somewhat arbitrary since different standards can be applied to result in different degrees of precision. A binary word in the attribute of "subject catagory" for example, may be the binary equivalent of a five digit Dewey decimal number while another standard may be based on seven digits. But the number of binary words in each attribute catagory is large and the number of combinations as the product of the attribute catagories is immense. It is believed that the content of conventional publications is only a minscule fraction of potential content as a consequence of technological and economic constraints upon present graphic media of mass communications.

OBJECTS

It is a general object to provide an improved facsimile publishing system and process which substantially removes technological and economic constraints upon access for editorial entities and upon choice for subscribers.

It is another object to provide the facsimile publishing system and process to enable a plurality of editorial entities to transmit page information to a communications satellite for broadcast, to receive the broadcast page information at a plurality of publishing facilities, and to print custom publications for a plurality of subscribers at each of the publishing facilities.

It is another object to provide the facsimile publishing facilities wherein the page information can be received and stored continuously and wherein any page signal which has been stored can be selected for printout according to individual subscribers interests to enable substantially continuous operation of the facsimile printers.

It is another object to supplement a subscriber's page selections with complementary facsimile pages, preprinted pages, and sample materials according to interests inferred from the subscriber selected pages thereby providing effectively targeted advertizing.

It is another object to incorporate into the publishing facilities a capability for dispensing preaddressed materials into a publication package for a subscriber to improve delivery economies.

It is another object to provide cumulative data on daily operations of the publishing facilities so that editorial entities and advertizers can know the total number of their pages which were delivered to subscribers.

SUMMARY

These and other objects and advantages which will become apparent are attained by the invention wherein page signals comprising facsimile and identifying code portions are broadcast to be received and stored in a plurality of publishing facilities each having a subscriber file for matching identifying codes representing subscriber selections with the identifying codes of the page signals thereby selecting page signals for each subscriber to control printing of custom publications.

The page signals originate with editorial entities which prepare one or more pages of text and illustrations on a periodic basis. The editorial entities are widely distributed geographically and range in size from an individual author to large news organizations. An identifying code is assigned to each page to designate title, editorial entity, and other identifying attributes. The pages are transformed to page signals comprising a facsimile portion which includes graphic and synchronizing information and the identifying code portion as a sequence of binary words. The page signals are transmitted to a broadcasting means such as a communications satellite.

Publishing facilities receive the broadcast page signals and may additionally receive page signals from a local editor and publisher thereby having access to information from international, national, regional, metropolitan, community, and neighborhood sources. The publishing facilities are located in communities ranging from sparsely populated rural areas to dense urban centers and may serve several hundred to several thousand subscribers. The custom publications are printed in route order for convenient delivery.

Within each publishing facility, the page signals are received and separated into their facsimile and identifying code portions. A page address memory reads the identifying code, generates an address, stores the identifying code with the address, and transfers the address to a primary memory. The primary memory stores the facsimile signal in a location specified by the address. A subscriber file contains each subscriber's page selections in a subscriber entry which designates page title and editorial entity as a portion of the identifying code. When the subscriber file advances to a subscriber entry, the identifying codes therein are transferred to the page address memory, are transformed into the addresses of the primary memory, and the addresses are transferred to the primary memory. The primary memory reads the facsimile signal contents of the received addresses and transfers them to a secondary memory. The secondary memory accumulates the facsimile signals for a subscriber entry, transfers them at printing speed to a facsimile printing assembly, and resets to receive the facsimile signals of another subscriber entry. The facsimile printing assembly operates substantially continuously to print custom publications.

An advertizer selection mode may be included to select additional complementary pages according to the subscriber's interests. An auxiliary selector communicates with the page address memory to receive the subscriber selected identifying codes, operates on the identifying codes to generate another identifying code for an advertizer selected page, and transmits the title and editorial entity portion of the generated identifying code to the page address memory which reads the corresponding address for transfer to the primary memory. Additionally, the auxiliary selector may generate an address for transfer to a preprinted page and sample dispenser to provide a preprinted page or product sample. The subscriber and advertizer selections as identifying codes are received by a contents generator which generates a table of contents in the form of a facsimile signal for transfer to the secondary memory as the last page for a subscriber's publication. The table of contents includes subscriber selected page titles and editorial entities, page charges and surcharges if any, advertizer selected pages and samples which are provided without charge, and a delivery charge. A cumulative data file develops daily operating data to include total pages of each title and editorial entity and total preprinted pages and samples. The cumulative data of all publishing facilities may be processed nationally so that each editorial entity and advertizer knows the number of his pages or samples delivered on a daily basis.

The facsimile publishing system of the invention effectively removes technological and economic constraints on access of editorial entities to publication. In contrast to an editorial entity in a conventional publishing organization having a large investment in publishing facilities, an editorial entity in a facsimile publishing system can function independently and with minimal equipment. Pages are transformed to page signals and transmitted to the communications satellite from a transmission facility at a small unit cost. Approximately 100,000 pages daily can be broadcast from two channels of television bandwidth on the communications satellite so that unit cost of broadcasting is also small. The small cost of entering page signals into the system enables emergence of small independent editorial entities with consequent diversity of content and large page volume. Advertizing revenues are received directly by successful editorial entities for ads on their pages to sustain their activities.

The facsimile publishing system provides automatic selective capability for pages and articles according to individual interests of subscribers simultaneously with improved access for editorial entities. All of the broadcast pages are available for selection. The selection of pages, which is based upon operations on the identifying codes, is made according to title and editorial entity or according to combinations of attributes. Accordingly, each subscriber receives only those pages which are in accord with his particular interests.

Subscriber selected classified advertizing is more detailed since an interest in the catagory is assured. The advertizer selection mode, which operates on attributes of the subscriber selected pages to infer probable interests, enables precise targeting of the complementary materials. Consequent reduction of unproductive deliveries enables use of more expensive materials while reducing total cost of an advertizing campaign.

An additional feature of preaddressed materials in a publication package combined with the data processing capabilities of the system enables fair prorating of delivery costs.

DESCRIPTION

Figure 1:
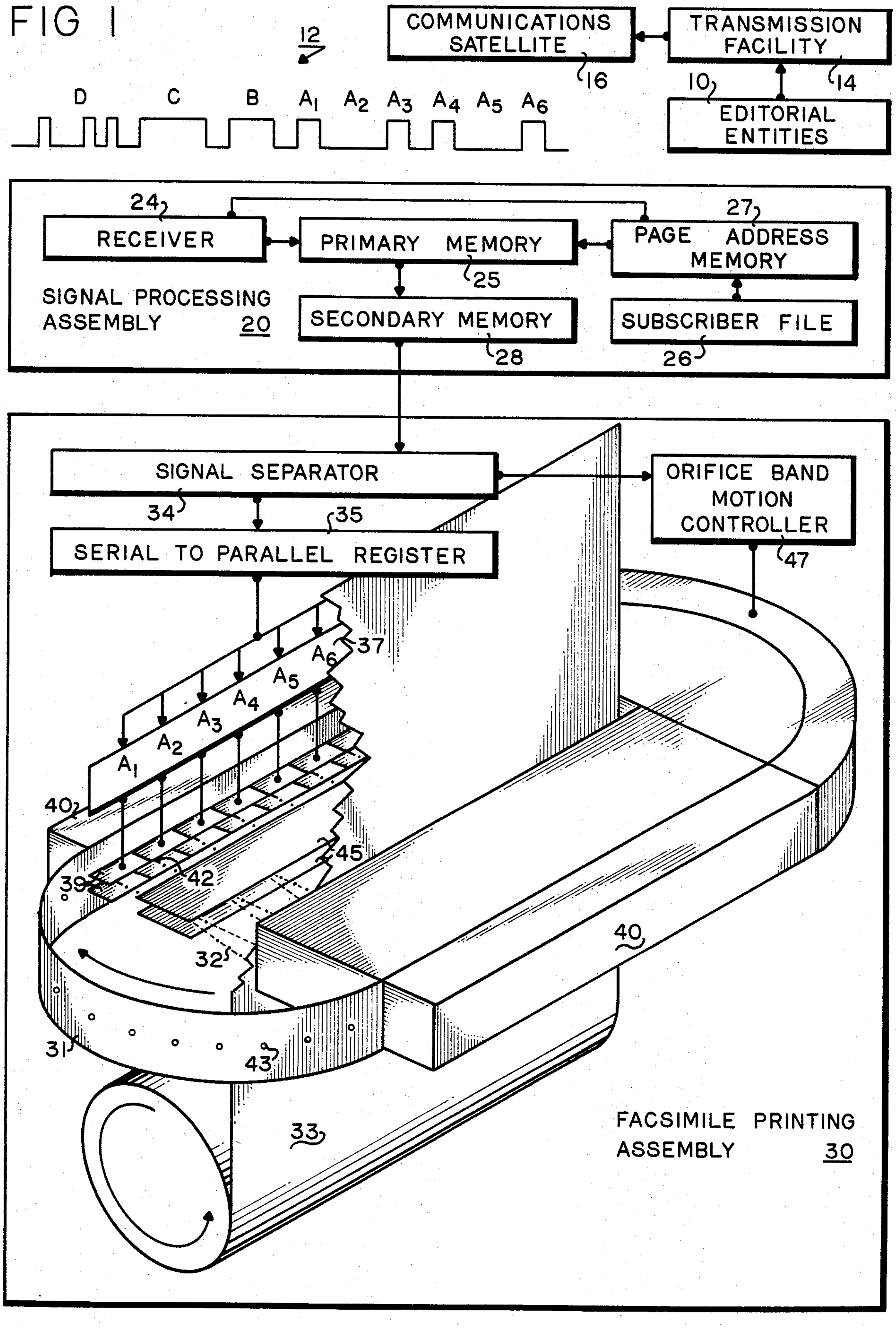
FIG. 1 is a schematic illustration of basic features of a facsimile publishing system according to the invention showing a representative page signal, an elementary signal processing assembly for storing and selecting page signals, and a preferred facsimile printing assembly.

In FIG. 1, editorial entities 10 prepare pages which are transformed to page signals such as 12 for transmission by a transmission facility 14 to a communications satellite 16 for broadcast. A preferred form of page signal is a time division multiplexed digital signal wherein pulse width distinguishes types of components which are designated $A_i$, B, C, and D. The $A_i$, B, and C components constitute a facsimile portion of the page signal. The $A_i$ components correspond to picture elements along a line, the B components synchronize transformation of a plurality of simultaneously generated $A_i$ components from a serial to a parallel form, and the C components synchronize position of the $A_i$ components along a line. The D components constitute an identifying code which enables the page signal to be identified and processed. The identifying code represents such page content information as title and editorial entity, characterizing attributes such as subject catagory and level of expertize, and billing data such as charges if any to advertizers or subscribers.

A facsimile publishing facility comprises signal processing assembly 20 and facsimile printing assembly 30. The signal processing assembly 20 represents an elementary embodiment of a page signal processing system wherein page signals are stored for selective recall according to each subscriber's interests. The broadcast signal is detected and amplified by receiver 24 and is stored in primary memory 25 for some predetermined period such as a day for general news. A subscriber file 26 comprises a memory for subscriber data wherein each subscriber entry includes a particular subscriber's page selections. As the publishing facility operates to print custom publications, the subscriber file 26 is advanced through the subscriber entries, the page selections therein are read as a portion of the identifying code, the identifying codes are transferred to the primary memory 25 directly or as page addresses which are stored in page address memory 27, and the corresponding facsimile page signals are transferred to secondary memory 28 for subsequent transfer to the printing assembly 30 at printing speed. When the contents of the secondary memory have been transferred, it is cleared, the subscriber file advances to another subscriber entry to read the page selections therein, and the corresponding page signals are transferred from the primary memory to the secondary memory. The process is repeated until all subscriber entries have been read and the selected pages have been printed.

Elementary facsimile publishing systems wherein a small number of pages such as 1,000 are broadcast daily store the complete page signal in the primary memory. The primary memory may be a conventional random access system such as a magnetic disc assembly or it may be a sequential access system such as a magnetic tape assembly. The identifying codes of the selected pages from a subscriber entry are matched to the identifying codes of the page signal stored in the primary memory and the matching page signals are transmitted to the secondary memory.

In the preferred embodiment contemplated for the facsimile publishing system wherein a large number of pages such as 100,000 are broadcast daily, the page signal is separated into its facsimile signal portion for efficient storage and into its identifying code portion for efficient processing. The two portions are each associated with a common identifier which is a page address in the primary memory. As the page signal is received and separated, its identifying code portion is stored in the page address memory with the page address and its facsimile signal portion is stored in the primary memory under the page address. The page content information in the form of the identifying codes is accessible in the page address memory for various useful operations which include selection of additional complementary pages according to a subscriber's inferred interests. Page title portions of the identifying codes in a subscriber entry are read, the complete identifying codes for the selected pages are recalled from the page address memory, component attributes of the recalled identifying codes are examined for significant clustering to infer interests, and combinations of attributes corresponding to the inferred attributes are generated. The page address memory is scanned to recall identifying codes having the combinations of attributes with the corresponding page addresses in the primary memory. The corresponding printout provides a closely targeted selection of pages for the mutual benefit of subscribers, advertizers, and editorial entities.

The facsimile printing assembly 30 receives the facsimile portion of the page signals continuously from the secondary memory to enable printing at maximum capacity.

Various known signal responsive printers could be adapted to the practice of the invention but economic factors limit choice to simple ink drop methods for printing on both sides of ordinary newsprint. A combination of large capacity and high graphic quality is desirable. A preferred facsimile printer is based on a traversing orifice band 31 which sweeps modulated columns of ink drops 32 as they project onto both sides of an unrolling sheet of paper 33. The projecting columns of modulated ink drops are formed by an ink jet process wherein a signal responsive electric field induces a charge proportional thereto on an electrically conductive ink jet which develops into charged and uncharged drops. The drops travel through a constant electrostatic field which deflects the charged drops so that only the uncharged drops continue in a straight trajectory to deposit on the paper. The basic ink jet process is capable of a rapid drop repetition rate at a high resolution. The orifice band printer preserves resolution by deposition of uncharged drops to avoid charged drop interactions and by a constant linear sweep which is adjusted to provide a dense image. A high drop repetition rate with a plurality of simultaneously operating ink jets provides high output.

The signal from the signal processing assembly 20 is received by signal separator 34 which separates the $A_i$, B, and C components of the facsimile signals according to their pulse width and serially transfers the $A_i$ components to serial to parallel register 35. Upon receival of a B signal component, the contents of the serial to parallel register are transferred in parallel to amplifier 37 and the serial to parallel register is cleared to accumulate another sequence of $A_i$ signal components. The amplifier 37 selectively transfers a null voltage pulse to otherwise positive charging electrodes such as 39. The drawing illustrates signal components $A_1$ to $A_6$ as states of the amplifier 37 corresponding to components $A_1$ to $A_6$ of the signal 12. Accordingly, the charging electrodes associated with components $A_2$ and $A_5$ are at a null voltage and drops formed at that time are uncharged to deposit on the paper. Liquid ink under pressure in an ink source 40 emerges as jets such as 42 from orifices such as 43. The jets are periodically disturbed by means within the ink source to induce separation of drops of uniform size in synchronism with the null voltage pulses on the charging electrodes. Drops which detached from the jets when corresponding charging electrodes were at a positive voltage are negatively charged and are deflected by deflecting electrodes 45 into a collector, not shown, for reuse.

The orifice band 31 is operated by orifice band motion controller 47 which is a servo drive responsive to the C signal components of the signal 12 from the signal separator 34. When the orifice band motion is synchronous, the C components occur simultaneously with passage of the orifices over a reference sensor, not shown. Deviations from synchronism are nulled by changing the force on the orifice band in proportion to negative deviation. The orifice band is constrained by air bearings to a path separate from solid structures and is operated by a fluid drive based on the liquid ink. Such absence of solid contact reduces extraneous vibration on the orifice band.

The orifice band printer shares with other ink jet printers the representative magnitudes of: an ink pressure of 4.2 kg/cm$^2$ (60 psig), an orifice diameter of 0.0025 cm to 0.005 cm (1 mil to 2 mils), a charging electrode potential of 150 volts, and an ink drop deflection field of 10,000 volts/cm. Basic principles of ink jet printing were disclosed by R. G. Sweet in "High Frequency Oscillography with Electrostatically Deflected Ink Jets", AD 437,951 National Technical Information Service, 1964. Later ink jet printers, which include an orifice plate to form an ink jet and parallel plate charging electrodes, are described in "I.B.M. Journal of Research and Development", Vol. 21, No. 1, pages 1–96, January 1977. An elongated orifice plate with linear arrays of orifices and an adjacent elongated piezoelectric transducer to periodically disturb emerging ink jets is described by Cha et al. in U.S. Pat. No. 4,138,689 and by Markham et al. in U.S. Pat. No. 4,296,417.

The following magnitudes exemplify operation of an orifice band printer for publishing: a drop repetition rate of 100 KHz, a dot density and resolution of 100 picture elements/cm (254 pel/in), a resulting orifice band speed of 500 cm/sec (16.4 ft/sec), an orifice interval of 0.5 cm (0.2 in) which corresponds to 50 ink jets operating simultaneously across a page sight width of 25 cm (10 in), a printing time of 1.9 sec for a page having sight dimensions of 25×38 cm (10×15 in), a paper speed of 23 cm/sec (45 ft/min), a maximum capacity of 90,900 pages daily, and a picture element information content of 9.5 megabits/page corresponding to a transmission rate of 5 megabits/sec. Accordingly, a single orifice band printer operating at maximum capacity over two shifts serves 1,200 subscribers with a daily publication averaging 50 pages.

Further details relating to orifice band printers may be found in the following issued and pending patents of the applicant: U.S. Pat. No. 3,971,040 describes basic features of an orifice band printer; U.S. Pat. No. 3,972,053 describes auxiliary transfer charging electrodes which are located between the charging electrodes 38 and switch therebetween for uniform charging of the sweeping ink jets; U.S. Pat. No. 4,117,518 describes the signal and means for its generation and processing; Ser. No. 353,640 describes confinement of ink around the orifice band by a counter pressure of air; and Ser. No. 385,915 describes a fluid drive for the orifice band using the liquid ink.

Figure 2:
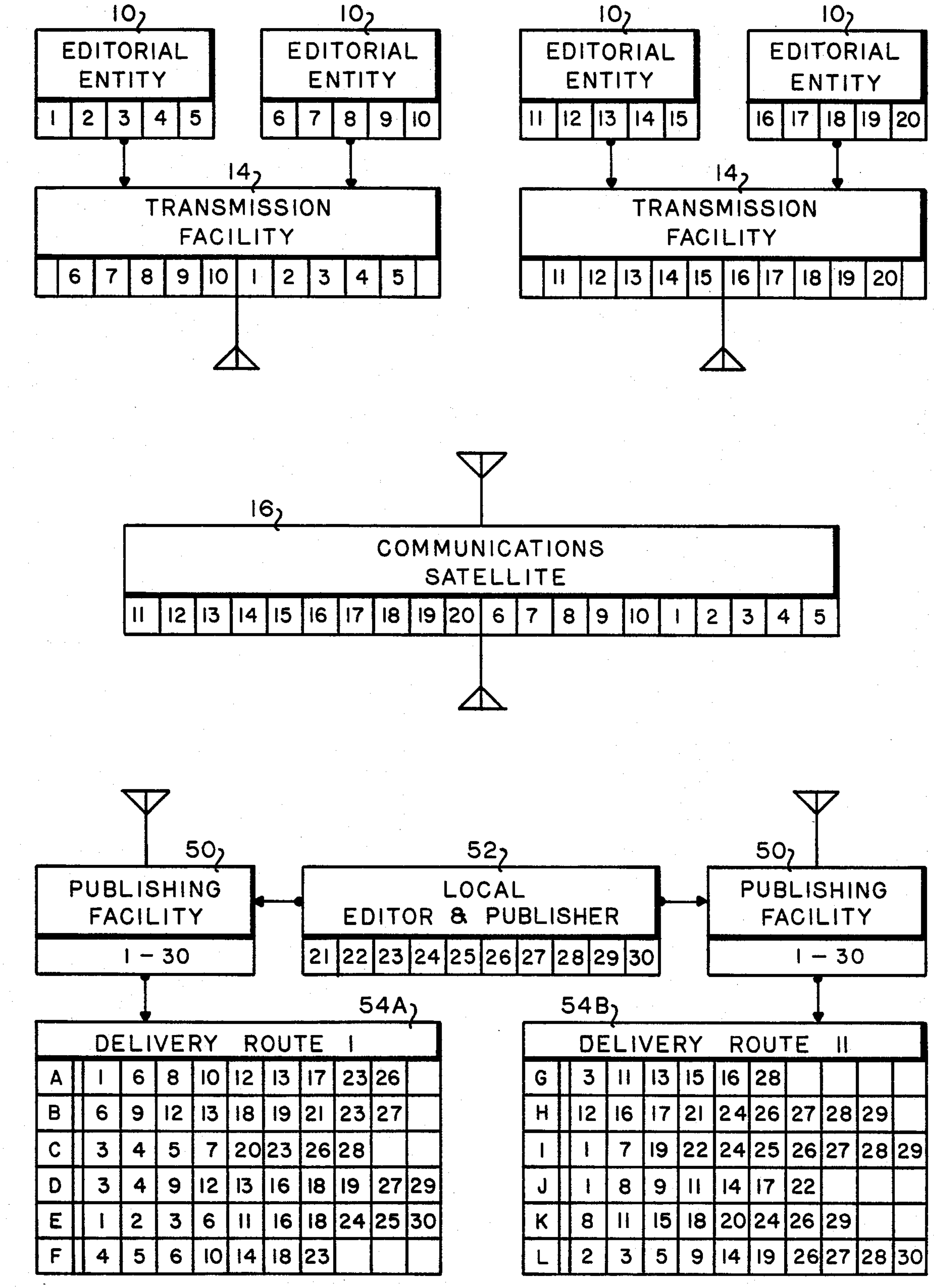
FIG. 2 is a diagrammatic representation of major components of the facsimile publishing system showing flow of page information from editorial entities to subscribers along delivery routes.

FIG. 2 illustrates general features of a facsimile publishing system with progression of page information from editorial entities to subscribers. Each page is represented as a numeral from 1 to 30 at lower portions of block components. The representation is highly simplified since the number of daily pages may be on the order of 100,000. For any number of pages and system components, however, page information converges from editorial entities to a common broadcasting source from which it diverges to subscribers. The page information is as conveniently transmitted across continents as between communities so that whatever the geographic distribution of editorial entities and subscribers, constraints of time and distance are effectively removed from mass graphic communications.

Editorial entities 10 are sources of page information for public communication and may range in size from major national news organizations which may prepare several hundred pages daily, through magazine editors and newsletter groups, to individual writers who may prepare only one page monthly. The page content normally includes related advertizing as a source of revenue for the editorial entity. Some editorial entities may elect to obtain additional revenue from page surcharges which are billed to the subscriber who selects the page and are collected through publishing facilities. Such page surcharges are designated as part of an identifying code which is part of the page information. The identifying code, which includes page title, name of the editorial entity, and other page identifying attributes, is prepared by the editorial entities according to industry standards. The information content of the identifying code is much less than the image information content. The title and editorial entity may each be designated by 30 letters represented by 5 bits each for a total of 300 bits. For 10 attributes consisting of a 4 bit identifier and a 16 bit quantifier, the information content is 200 bits.

Transmission facilities 14 transform page information from editorial entities into standard page signals for transmission to communications satellite 16. The editorial entities may communicate with the transmission facilities by any appropriate means such as facsimile, teletypwriter, or mail. Although a large editorial entity may have a private transmission facility for transforming page information directly into a page signal through a computer, smaller editorial entities would use common transmission facilities for transforming page images into the page signals. The page signals are accumulated and transmitted by the transmission facility in response to a transponder system, not shown, to communications satellite 16 by a microwave transmitter. Page signals are transmitted in the order that page information is received although news and other timely subject catagories recognizable through the identifying code may be given preference during predetermined hours. Publishing operations normally extend over two shifts for a morning and an evening edition and the predetermined hours enable the timely page signals to all be broadcast before a shift begins. The communications satellite and its ground facilities are conventional digital systems. A channel capacity of 5.8 megabits/sec corrresponds to an estimated signal traffic of 100,000 pages daily.

Publishing facility 50 includes the signal processing assembly 20 and the facsimile printing assembly 30 of FIG. 1. The publishing facility receives the page signals as they are broadcast from the communications satellite and further receives from local editor and publisher 52 local page signals having content of local interest with no substantial significance beyond the community. The local editor and publisher functions as a local transmission facility by accepting pages from local editorial entities for transformation to page signals. The local editor and publisher also functions as an editorial and administrative headquarters for a plurality of publishing facilities which are then free to concentrate on printing and delivery. The editorial functions include editing of neighborhood and community news, services for local advertizers, and preparation of classified advertizing. News and retail advertizing are extended to smaller neighborhoods. Classified advertizing can be larger and more informative since they are efficiently provided only to those who select the classified catagory. As an example, a classified real estate ad may include photographs, lot and floor plans, and detailed descriptions. The ad may appear under several catagories such as price range and location. Administrative functions of the local editor and publisher include billing of subscribers and advertizers, transfer of page surcharges to editorial entities, purchasing, and technical assistance.

The publishing facilities transform the page signals into printed pages according to subscriber's interests in an order corresponding to addresses along a delivery route. The letters A–F in delivery route I, 54A, and G–L in delivery route II, 54B, represent subscriber's names and addresses while the rows of numbers represent their page selections. Differences among page selections represent individual diversity. Pages for an individual subscriber may be specified directly according to title and editorial entity or they may be specified indirectly as combinations of attributes which include subject catagories, level of expertize, general educational level, editorial style, and values and premises, all of which are part of the identifying code. Additionally, complementary pages may be provided at no charge to the subscriber by advertizers or editorial entities by inferring interests from the identifying codes for the selected pages. Since page signals broadcast by the communications satellite are available to all subscribers and are supplemented by local page signals, each subscriber whether in a sophisticated urban environment or in a small rural community has full access to pages from international, national, regional, metropolitan, community, and neighborhood editorial entities. A subscriber may select any number of pages, which is expected to average 50, from the approximately 100,000 pages which are broadcast daily. A publishing facility may serve several hundred to several thousand subscribers.

Figure 3:
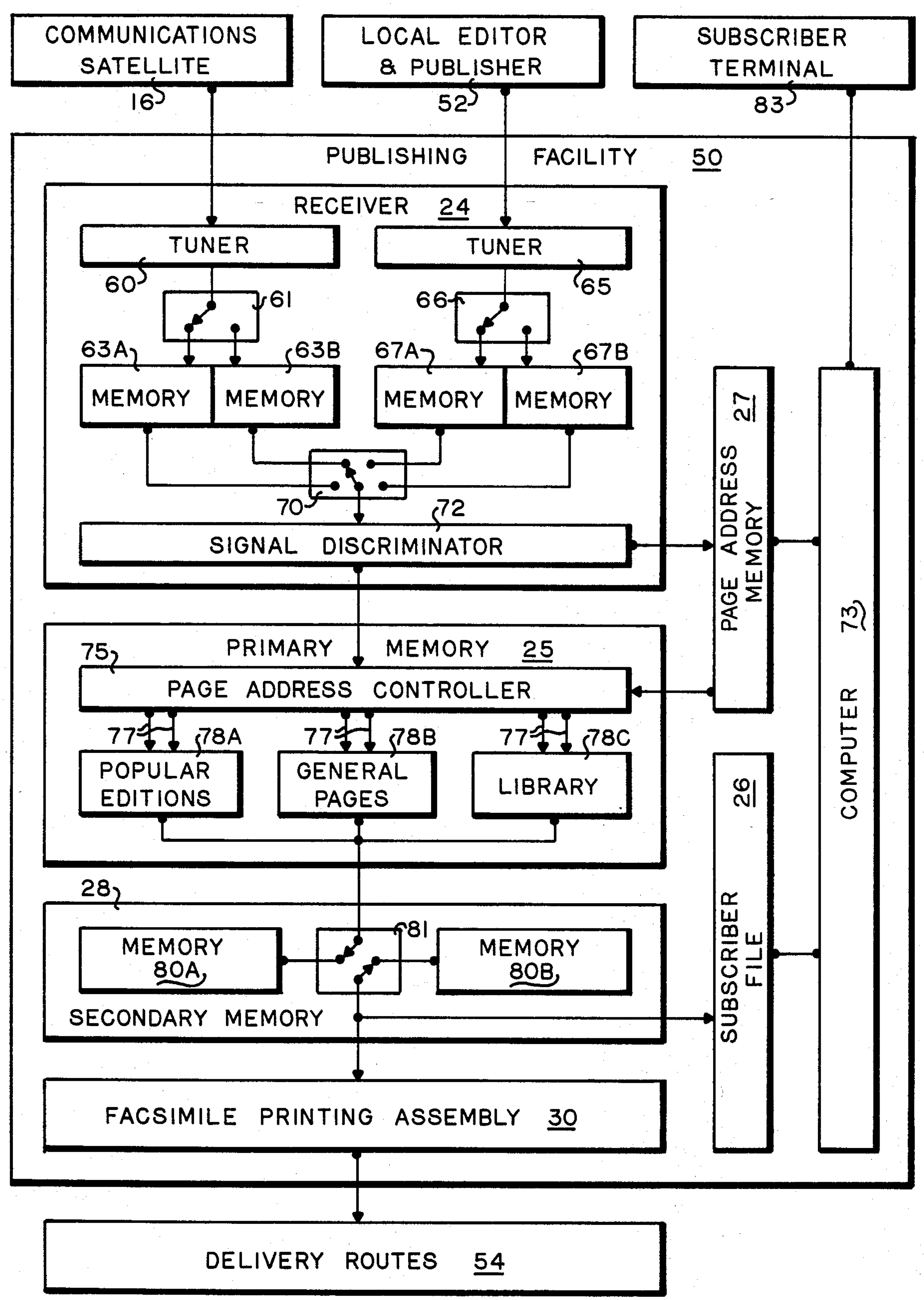
FIG. 3 is a schematic block diagram of a basic publishing facility showing in more detail a signal processing assembly for storing page signals in a primary memory and selectively recalling therefrom the page signals according to each subscriber's interests to control a facsimile printer which thereby prints custom publications.

FIG. 3 illustrates operations on page signals by the signal processing assembly 20 of a facsimile publishing facility 50 for efficient storage and selective recall to enable printing according to individual subscriber interests.

In receiver 24, tuner 60 is tuned to the page signal carrier frequency of communications satellite 16. The detected page signal is amplified and transferred through electronic switch 61 to memory 63A or to memory 63B. Similarly, tuner 65 is tuned to the page signal carrier frequency of local editor and publisher 52 and the detected page signal is amplified and transferred through electronic switch 66 to memory 67A or to memory 67B. The memories 63A, 63B, 67A, and 67B, the switches 61 and 66, and electronic switch 70 function as a buffer to enable simultaneous recording and recall of the page signals as they are received. Circuits, not shown, sense remaining capacity of the memories which are connected to the tuners and sense completion of the page signals to enable transfer during page signal intervals. Transfer of contents of the memories 63A, 63B, 67A, and 67B into signal discriminator 72 is sufficiently faster than recording of the contents that adequate memory capacity is available at all times. With reference to the illustrated switch states, when the contents of memories 63B and 67B have been transferred to the signal discriminator, the memories have been cleared for recording, and a predetermined capacity has been attained by either memoy 63A or 63B, switches 61, 66, and 70 are enabled for transfer. Upon completion of a page signal, switch 61 transfers to memory 63B and similarly switch 66 transfers to memory 67B to enable recording thereinto. Switch 70 at the same time transfers to and remains at memory 63A until its contents have been transferred to the signal discriminator. The switch 70 then transfers to memory 67A to similarly transfer its contents. The memories 63A and 67A are cleared for recording, the switches 61 and 66 transfer back to the memories 63A and 67A and switch 70 transfers to memory 63B followed by transfer to memory 67B to complete a cycle which continue as long as page signals are being received. Conventional components are used for embodiments of the described switching and page signal recording, reading, and transfer operations. Such components may include video cassette apparatus for the memories A, B, C, and D.

The signal discriminator 71 separates the page signal into its D components which represent the identifying code and into its $A_i$, B and C components which are the facsimile signal. The signal components are separated according to their pulse widths by known circuit means. The D components are transferred to page address memory and the $A_i$, B, and C components are transferred to primary memory 25. The primary memory records the facsimile signal at an address which designates a particular memory apparatus and a storage location therein. The page address memory generates the address and stores the address with the identifying code so that the identifying code and facsimile portions of the page signal are associated in the publishing facility through the address.

The page address memory generates an address for a page signal according to expected demand and enduring interest so that rapid access and economical signal storage can be optimized. Relevant information is obtained from cumulative data stored in computer 73 and from the identifying code. Title and editorial entity portions of the identifying code are transferred to the computer which recalls prior demand for the page and generates a popularity index therefrom. Enduring interest is inferred from the subject catagory or is included directly in the identifying code. The popularity index and period of enduring interest are transformed according to a program into a portion of an address which designates the type of memory assembly in the primary memory. A particular memory assembly is selected after current page selections for a subscriber entry are read to preclude designating a memory assembly which is being read for transfer to the secondary memory. The remainder of the address is designated as the next unused sequential location in the selected memory assembly to complete the address. The address is then stored in association with the identifying code in the page address memory and is transferred to page address controller 75 in the primary memory. The page address controller coordinates flow of the address and of the facsimile signal through a pair of channels 77 into memory assemblies designated popular news editions 78A, general pages 78B, and library 78C. A delay memory not shown in the page address controller 75 stores the facsimile signals until the address has been transmitted to the designated memory assembly and the location therein is ready to record the facsimile signal. The facsimile signals are stored on media which provide appropriate access times and storage densities. Pages which are printed in a large number of publications such as human interest news and sports oriented toward an average reader and full page ads which are prepaid for each publication are stored in popular editions 78A on magnetic discs for rapid access. Pages which have a more limited popularity such as news analyses, business and science news, and classified ads are stored in general pages 78B on magnetic videotape. A plurality of units are used to reduce access time and to enable recording of one unit while reading another. Pages having an enduring interest such as review articles, buyer's guides, and background information are stored in library 78C on magnetic videotape and optical discs.

Secondary memory 28 receives from the primary memory high frequency intermittent page signals and transmits to the facsimile printing assembly substantially continuous facsimile signals at a lower frequency corresponding to the nominal printing rate. Transfer of the facsimile signals from the primary memory to the secondary memory is controlled by subscriber file 26. Subscriber information is stored in the format of the identifying code in a subscriber entry of the subscriber file. A subscriber entry includes the subscriber's name, delivery address, page selections, and cummulative billing data. The memory for storing the subscriber entries is a magnetic tape or disc on which informaion is recorded and read conventionally. The subscriber file advances to a subscriber entry and reads the page selections which are normally specified by title and editorial entity as a portion of the identifying code but may also be specified as combinations of attributes of the identifying code. A page order may be specified by adding a page number to the page title or to the subject catagory attributes. The codes representing the page selections are transferred through the computer to the page address memory which is read to recall addresses which correspond to the page selections. The addresses are transferred to the page address controller which recognizes the particular memory apparatus in 78A, B, or C specified by the address, routes the the location information thereto through the appropriate channel 77 so that the memory apparatus locates the facsimile signal according to the address, and the facsimile signal therein is read and transferred to the secondary memory. The secondary memory comprises two or more magnetic disc memories such as 80A and 80B which are connected alternately by electronic switch 81 between the primary memory and the facsimile printing assembly so that as one memory is receiving the other is transmitting. The facsimile signals are received intermittently as the memory apparatus 78A, B, or C searches for the address and reads the contents which are recorded on in the memories 80A or B on tracks which correspond to the page numbers so that the facsimile signals are in order and adjacent on the magnetic disc. In the illustrated position of switch 81, memory 80B transmits the facsimile signals which are in page order to the facsimile printing assembly at a regulated slow disc rotation speed which corresponds to the nominal printing rate so that the printer is synchronized with the disc at an optimum frequency. Since the printing speed is much slower than the signal transfer rate from the primary memory, memory 80A will be in a ready state before transfer to the facsimile printing assembly from memory 80B is complete. A terminal code at the end of the facsimile signal for the last page is detected by the memory 80B to actuate erasure of its contents and reset for recording, by memory 80A to actuate reset for transmission of facsimile signals, by switch 81 to trigger transfer to its alternate position, and by the subscriber file to actuate advance to the next subscriber entry. A terminal code is appended at the end of the subscriber entry to progress through the primary memory and the secondary memory to continue the process of transfer of selected facsimile signals to the facsimile printing assembly until publications have been printed for all subscribers in the subscriber file who subscribe to the current edition.

A subscriber terminal 83 enables a subscriber to communicate with his entry in the subscriber file to add or delete pages. The subscriber terminal may be a computer terminal which displays current selections on a video screen. The subscriber enters a private personal code by a keyboard or by a card reader, the computer reads the subscriber entry and transforms the identifying codes therein into readable tiles and editorial entities for screen display, the subscriber keys in pages to be added or deleted, the computer transforms the page changes into corresponding identifying codes and executes the changes in the subscriber entry, and displays the updated page selections for confirmation. Alternatively, a telephone may be used to key in the personal and to add or delete pages with confirmation by voice synthesizer.

Figure 4:
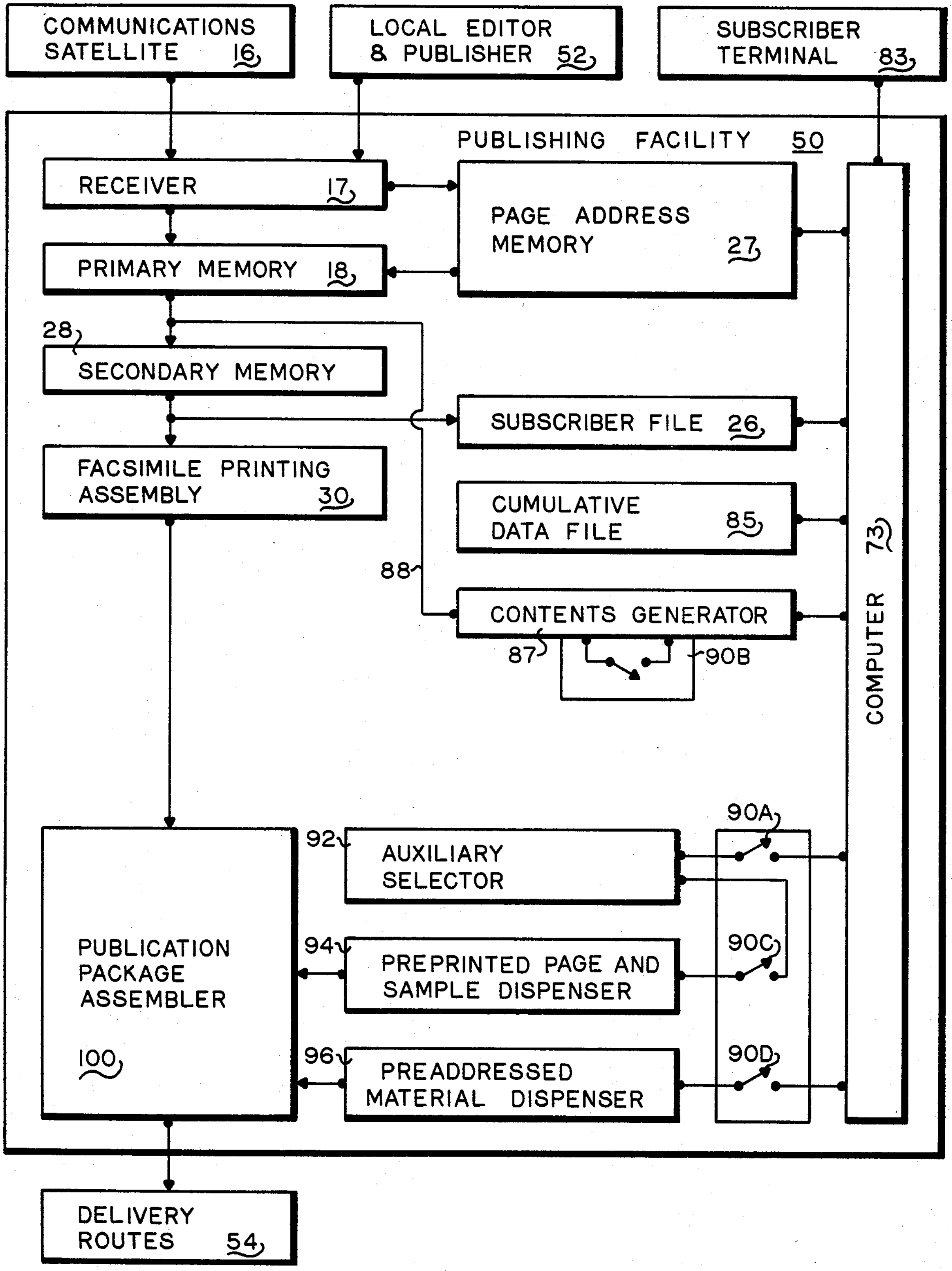
FIG. 4 is a schematic block diagram of a publishing facility which: prints a table of contents of each publication and accumulates daily page selection data; adds according to each subscriber's interests advertizer selected facsimile pages, conventionally preprinted pages, and samples; and, adds to a subscriber's publication package materials preaddressed to him for combined delivery.

The publishing facility 50 of FIG. 4 retains a subscriber selection mode for publishing subscriber selected facsimile pages and adds thereto capabilities for generating a table of contents in each publication and for accumulating daily page demand data for editorial entities, advertizers, and others. Additionally, the publishing facility has an advertizer selection mode with complementary selections by advertizers according to the subscriber's interests as they are inferred from programs which operate on data in the subscriber file and page address memory. The complementary selections include facsimile printed pages, conventionally preprinted pages, and sample products. An advertizer does not have access to any subscriber's identity but does receive an accounting of quantities of selections which were distributed and participates in development of the programs which operate on attributes to target particular subscribers for selection. Additionally, the publishing facility has a general delivery mode for assembly of preaddressed materials, such as conventional magazines and small parcels, in a publication package for distribution along the delivery routes. The publication package comprises the facsimile pages selected by the subscriber for which he is billed, the complementary facsimile pages, the preprinted pages, and the sample products which are billed to the advertizers for services, and the preaddressed materials which are prepaid by senders.

Page signals are received by receiver 17, the D signal components of the identifying codes are transferred to page address memory 27 for storage along with an address assigned for the primary memory 18, and the $A_i$, B, and C components of the facsimile signals are transferred to and stored in their assigned addresses in the primary memory. Subscriber file 26 reads a subscriber entry, which includes a subscriber's page selections in the form of title and editorial entity portions of the identifying code, and generates a first terminating code for transmission to the page address memory through computer 73. The page address memory matches the received portions of the identifying codes against the stored identifying codes and transmits the associated addresses to the primary memory with the first terminating code after the last address. As the page address memory is transmitting the addresses to the primary memory, it is also transmitting the associated complete identifying codes to an information bus, not shown, in the computer. Connected to the information bus are cumulative data file 85 and contents generator 87. The contents generator operates on the received identifying codes to prepare a table of contents in the form of a facsimile signal. The primary memory receives the addresses from the page address memory and transfers their contents with the first terminating code as the last signal for storage in the secondary memory. When the contents generator receives the first terminating code through channel 88, it transmits back through channel 88 the table of contents as the last page with a second terminating code at the end. As the facsimile signals for a subscriber entry with the table of contents and the second terminating code are transferred to the facsimile printing assembly 25, they are monitored by the subscriber file which responds to the second terminating code by advancing to another subscriber entry thereby repeating the process of selecting page signals to control printing of a custom publication.

The advertizer selection mode for facsimile pages is enable by closing switch 90A which connects auxiliary selector 92 to the information bus to receive the complete identifying codes for the subscriber selected pages and by closing switch 90B which retunes the contents generator to a third terminating code thereby precluding response to the first terminating code. The auxiliary selector operates on the subscriber selected identifying codes from the information bus to generate one or more advertizer selected pages in the form of title and editorial entity portions of the identifying code. When all of the subscriber selected identifying codes have been processed by the page address memory, the first terminating code is transferred to the information bus. The auxiliary selector then transfers the advertizer selected identifying codes followed by a third terminating code to the page address memory and blocks further reception by the auxiliary selector of the identifying codes from the information bus to preclude operation on its own page selections. The cumulative data file and the contents generator continue to receive the advertizer selected identifying codes from the information bus. As the third terminating code is received by the contents generator through channel 88, the facsimile signal for the table of contents with the second terminating code is transmitted back to the secondary memory for storage therein. When signals comprising the subscriber and advertizer selected facsimile signals with the second terminating code have been transferred from the secondary memory, the subscriber file responds to the second terminating code by advancing to another subscriber entry thereby repeating the process of page selection. The second terminating code, as an indicator of a completed cycle, is also transmitted to the auxiliary selector for reset to resume reception of signals from the information bus.

The advertizer selection mode is extended to preprinted pages and sample products by transmitting their addresses from the auxiliary selector to preprinted page and sample dispenser 94 through switch 90C. The addresses correspond to bins in which the preprinted pages and samples are stacked. For handling convenience, the preprinted pages are of the same size as the facsimile pages and the samples are packaged in boxes of a limited number of standard sizes. Various mechanisms are known for storing and dispensing selected packages. As one example, the boxes may be stacked in a rotating bin assembly wherein the bins are advanced until a selected address is aligned with a dispenser. The dispenser is energized and a box is transferred onto a holding bin. A similar mechanism is used for bins which contain the preprinted pages. Within the auxiliary selector, the addresses which are transmitted to the preprinted page and sample dispenser and the identifying code titles and editorial entities which are transmitted to the page address memory are generated by similar means. The complete subscriber selected identifying codes from the information bus are are read for predetermined combinations of of attributes and predetermined identifying codes or addresses are generated when the combinations of attributes occur. Such operations are executed by conventional means. The auxiliary selector ignores the title and editorial entity portion of the identifying code and operates on the attribute portion. The attribute portion is represented by words consisting of binary digits. Each word includes an attribute identifier such as "subject catagory" and a corresponding attribute quantifier such as the binary equivalent of a Dewey decimal number. As an example, the attribute "subject catagory-530.32" may be represented by "0001-110011110010100". The attribute "level of expertize-5" may be represented by "0010-000000000000101". Other attributes may be represented by similar binary words. A reasonable number of attributes for advertizer selection is expected to be less than ten. Each advertizer participates in a determination of combinations of attributes which will trigger selection of his addresses. Each attribute word is stored in a register and the received attribute words of the identifying codes are compared thereto. Upon coincidence, the predetermined address is generated. As one example, a supplier of hybrid wheat provides a package containing sample seeds, a promotional cassette recording, and a brochure when a subscriber selects a page in the subject catagory of "wheat farming" at a high level of expertize. Once the package is selected, the address generator is inhibited until cleared in response to the second terminal code to preclude multiple packages for the same subscriber. As another example, an editorial entity which prepares facsimile pages and a quarterly magazine on travel may target professionals in medicine, law, science, engineering, or business and thus specify subject catagories in these areas at a high level of expertize. Upon selection, sample facsimile pages and a preprinted page are provided.

The cumulative data file 85 receives the identifying codes from the information bus. Internal memories are developed for title and editorial entity from the identifying codes by recording the title and editorial entity if they are not already stored and by incrementing their cumulative counts. Advertizer selection data is developed by generating in the preprinted page and sample dispenser an advertizer name in the form of an identifying code for an editorial entity and transferring the identifying code to the information bus. The cumulative data is used by the publishing facility to determine popularity of pages for priority storage in the primary memory, by the local editor and publisher for billing and transfer of charges, by local advertizers, and by national statistical organizations for a daily national operations report for editorial entities, advertizers, and other interested parties.

Preaddressed material dispenser 98 is connected through switch 90D to the subscriber file which transmits a subscriber address upon advance to another subscriber entry. Preaddressed materials include magazines, books, and small parcels which are presorted into bins corresponding to the subscriber address. The bins are part of a dispensing mechanism of conventional design which aligns the bin and an extracting arm in response to the subscriber address. The extracting arm deposits the contents of the bin in a holding bin adjacent to publication package assembler 100.

The publication package assembler sequences stacking of pages and parcels for wrapping into a convenient delivery package. The pages from the facsimile printing assembly are stacked in a holding bin. When the second terminating code is received, the table of contents as the last page is being stacked, the subscriber's name and address are conventionally printed on a label, contents of the holding bins are deposited in a wrapping assembly not shown with pages first and parcels on top to form a publication package, and the publication package is wrapped, labeled, and stacked for delivery.

What I claim is:

1. A process for publishing custom facsimile publications for a plurality of subscribers, comprising the steps of:

receiving page signals, each said page signal comprising a facsimile signal portion and an identifying code portion, storing the page signals such that the facsimile signal is associated with the identifying code, storing for each subscriber page selections as a portion of the identifying code, reading the page selections for one subscriber and matching the portion of the identifying codes thereof with the identifying codes of the stored page signals to identify the associated facsimile signals, reading the identified facsimile signals for transfer to a facsimile printing assembly to print a custon publication for said one subscriber, and repeating the reading of the page selections for other subscribers and the subsequent steps so that custom publications are printed for the other subscribers.

2. The process of claim 1 wherein the step of storing the page signals comprises:

reading the identifying code portion and operating thereon to assign an address in a primary memory and storing the facsimile signal at the address in the primary memory, and storing the identifying code portion in a page address memory in association with the address whereby the facsimile signal portion can be located from the address information in the page address memory.

3. The process of of claim 1 wherein the step of reading the page selections for one subscriber includes the further step of operating on the identifying codes for the subscriber selected pages to generate identifying codes for additional complementary pages, said generated identifying codes being added to the subscriber identifying codes for matching with the identifying codes of the stored page signals thereby providing complementary advertizer selected facsimile pages according to the subscriber's interests.

4. The process of claim 3 comprising the further step of operating on the identifying codes for the subscriber selected pages to generate an address for selecting preprinted pages and product samples for dispensing thereof and assembling in a publication package thereby providing complementary advertizer selected preprinted pages and product samples according to subscriber interests.

5. The process of claim 1 further comprising the steps of:

reading delivery address information for said one subscriber, matching the delivery address information with address locations for preaddressed materials which are sorted into the address locations which correspond to the delivery address information, and dispensing the preaddressed materials in the address location for assembly with the subscriber's selected facsimile pages.

6. The process of claim 1 comprising the further steps of:

transforming page information from a plurality of editorial entities into the page signals, and transmitting the page signals to a broadcasting means for broadcast whereby the page signals are received to begin the steps of claim 1.

7. A process for custom facsimile publication, comprising the steps of:

collecting page information from a plurality of editorial entities, transforming the page information into page signals for control of facsimile printers, and transmitting the page signals to a plurality of facsimile publishing facilities, storing the page signals in each of the publishing facilities so that any of the page signals can be read from a memory in which said page signals are stored, selectively reading, according to each of a plurality of subscribers' interests, page signals from the memory, and controlling facsimile printing by the selectively read page signals whereby a custom publication is printed for each of the plurality of subscribers.

8. The process of claim 7 wherein the step of selectively reading page signals from the memory comprises:

maintaining a subscriber file which includes the subscribers' page selections and reading each of the subscriber's page selections in a sequence whereby the page signals are selectively read according to each of the subscriber's interests.

9. The process of claim 8 wherein the sequence is the route order of delivery locations.

10. The process of claim 8 comprising the further step of selecting preprinted pages for each subscriber for assembly with the selected facsimile pages for said subscriber.

11. The process of claim 8 further comprising the step of reading the subscriber entry for a delivery location and selecting preaddressed materials to match the delivery location for assembly with the selected pages for combined delivery of the preaddressed materials and the selected pages.

12. The process of claim 10 further comprising the step of collecting information on page selections for storage in a cumulative data file.

13. A system for facsimile publishing, comprising:

means for receiving page information from a plurality of editorial entities, means for transforming the page information to page signals, said page signals comprising graphic and synchronizing information to control a facsimile printer and comprising page identifying codes, means for transmitting the page signals to a plurality of publishing facilities having receivers therein for the page signals, a primary memory for storing the received page signals, a subscriber file having recorded therein subscriber entries for a plurality of subscribers, each said subscriber entry having recorded page selections corresponding to the page signals in the primary memory, means for reading from the primary memory the page signals corresponding to the page selections in a subscriber entry and means for transmitting the read page signals to a secondary memory for storage therein, means for reading the page signals in the secondary memory for transfer to a facsimile printer for control thereof and means for erasing the secondary memory when the page signals therein have been transferred to the facsimile printer, and means for advancing the subscriber file to another subscriber entry to repeat the reading of the page signals in the primary memory corresponding to the selected pages in the subscriber file entry for transfer to the secondary memory and the facsimile printer, erasing the secondary memory, and advancing the subscriber file to another subscriber entry thereby printing for each subscriber entry in each publishing facility a custom publication consisting of pages selected from the page information of the editorial entities.

14. The system of claim 13 wherein the means for receiving page information from a plurality of editorial entities comprises a plurality of transmission facilities, each said transmission facility transforming the page information into standard page signals and transmitting the page signals to the plurality of publishing facilities through a common transmitting means.

15. The system of claim 14 wherein the common transmitting means is a communications satellite for broadcasting the page signals.

16. The system of claim 14 further comprising a local editor & publisher for transmitting page signals to selected publishing facilities.

17. A facsimile publishing facility, comprising:

a receiver for page signals which comprise graphic and synchronizing information to enable a facsimile printer to print a page under control of said page signals and which further comprise a page identifying code, a primary memory comprising a medium for storing the page signals, a subscriber file having recorded therein subscriber entries for a plurality of subscribers, each said subscriber entry having recorded page selections corresponding to page signals in the primary memory, and means for advancing the subscriber file to select a subscriber entry, for reading the page selections therein, and for reading the corresponding page signals from the primary memory, a secondary memory for storing the page signals read from the primary memory, and means for transferring the page signals stored in the secondary memory to the facsimile printer and means for erasing the secondary memory thereafter so that the subscriber file can be advanced to another subscriber entry to repeat the transfer of page signals from the primary memory, to the secondary memory, and to the facsimile printer whereby custom publications are printed for a plurality of subscribers.

18. A facsimile publishing facility, comprising:

a receiver for page signals, said page signals comprising a facsimile signal portion representing graphic and synchronizing information for controlling a facsimile printer and comprising an identifying code portion representing identifying attributes of page content including title and editorial entity to control selection of pages, means for separating the page signal into the facsimile signal and the identifying code, a page address memory for assigning an address for each facsimile signal and for storing the identifying code corresponding to the facsimile signal in association with said address whereby the facsimile signal portion and the identifying code portion of a page signal are associated through the address, a primary memory having means for storing the facsimile signals at the assigned addresses, a subscriber file having recorded therein subscriber entries for a plurality of subscribers, each said subscriber entry having stored signals for subscriber selected pages, said signals comprising portions of the identifying codes, means for transferring said portions of the identifying codes to the page address memory for matching to the identifying codes stored therein, means for transferring the address associated with the matched identifying codes to the primary memory, and means for reading the facsimile signal contents of said addresses, a secondary memory for storing the read facsimile signal contents of said addresses, and means for transferring the stored facsimile signals from the secondary memory to a facsimile printing assembly to control printing of custom publications.

19. The facsimile publishing facility of claim 18 wherein the primary memory comprises a plurality of memory assemblies having differing access times and information storage capacities and means for delaying the facsimile signal as information which includes enduring value and popularity is processed to assign the address in one of the memory assemblies whereby the facsimile signal is stored for efficient operation of the primary memory.

20. The facsimile publishing facility of claim 18 wherein the receiver comprises a plurality of tuners to receive simultaneously signals from a plurality of signal sources and further comprises a plurality of buffer memories connected to each said tuner through a transfer switch so that the memory connected to a tuner stores the signals as they are received and another of the connectable memories is in a state for transfer of previously stored signals to the primary memory thereby enabling simultaneous and continuous receiving of the signals from the plurality of sources.

21. The facsimile publishing facility of claim 18 wherein the secondary memory comprises a plurality of similar memories each connectable to the primary memory and the facsimile printing assembly through a transfer switch, said transfer switch operating to connect one of the memories with the primary memory to store facsimile signals representing page selections for one subscriber entry and at the same time operating to connect another of the memories with the facsimile printing assembly to transfer previously stored facsimile signals at printing speed thereto whereby the facsimile signals are transferred to the secondary memory intermittently at a high speed and are transferred to the facsimile printing assembly substantially continuously.

22. The facsimile publishing facility of claim 18 further comprising a subscriber terminal communicating with the subscriber file to control access to a specified subscriber entry and to add or delete pages therein.

23. The facsimile publishing facility of claim 18 further comprising an auxiliary selector to select complementary materials for addition to pages selected by the subscriber, means for communicating to the auxiliary selector identifying codes for the pages selected by the current subscriber entry, said auxiliary selector having means for operating on the identifying codes of the selected pages to generate information for selecting the complementary materials.

24. The facsimile publishing facility of claim 23 wherein the means for communicating the identifying codes to the auxiliary selector comprises means for transferring the identifying code portions from the subscriber entry to the page address memory which reads the the complete identifying codes for the selected pages and means for transferring the read identifying codes to the auxiliary selector.

25. The facsimile publishing facility of claim 24 wherein the complementary materials comprise facsimile pages and the generated information comprises portions of identifying codes which are transferred to the page address memory to generate addresses for transfer to the primary memory.

26. The facsimile publishing facility of claim 24 wherein the complementary materials comprise preprinted pages, the generated information comprises addresses in a preprinted page and sample dispenser, said addresses being associated with storage compartments for the preprinted pages, and means responsive to the address information for dispensing a preprinted page from the storage compartment associated with the address.

27. The facsimile publishing facility of claim 26 wherein the complementary materials further comprise product samples, the addresses are associated with storage compartments for the product samples, and comprising means responsive to the address information for dispensing a product sample from the storage compartment associated with the address.

28. The facsimile publishing facility of claim 18 further comprising:

a preaddressed material dispenser having bins for sorted preaddressed materials, each bin having an address which corresponds to the addresses of the preaddressed materials in the bin, means responsive to the address for dispensing the contents of the associated bin, and means for transferring the address from the subscriber entry to the preaddressed materials dispenser whereby the means responsive to the address dispenses the contents.

29. The facsimile publishing facility of claim 18 further comprising a contents generator for preparing a table of contents page, said contents generator comprising:

means for receiving identifying codes for pages selected according to a subscriber entry and for selecting and storing predetermined portions of said identifying codes, means for transforming the predetermined portions of the identifying codes into formated character signals according to a program for composing a contents page, means for transforming the composed contents page into a facsimile signal, and means for detecting completed transfer of the facsimile signals selected according to the subscriber entry to the secondary memory and for transferring the facsimile signals for the table of contents to the secondary memory upon said detecting.

30. The facsimile publishing facility of claim 18 further comprising a cumulative data file which comprises:

means for receiving identifying codes for pages which were printed and for other materials which were delivered to subscribers, means for recording title and editorial entity portions of said identifying codes the first time that they are received, and means for incrementing cumulative counts of the recorded title and editorial entity portion of the identifying codes when they are received subsequently thereby providing a record of all of the pages for each editorial entity which were selected over a period of operation of a publishing facility.

* * * * *